United States Patent
Seo et al.

(10) Patent No.: US 9,609,639 B2
(45) Date of Patent: Mar. 28, 2017

(54) METHOD FOR TRANSCEIVING DOWNLINK CONTROL CHANNEL IN WIRELESS COMMUNICATION SYSTEM, AND APPARATUS THEREFOR

(71) Applicant: LG ELECTRONICS INC., Seoul (KR)

(72) Inventors: Hanbyul Seo, Anyang-si (KR); Suckchel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 14/387,381

(22) PCT Filed: Mar. 27, 2013

(86) PCT No.: PCT/KR2013/002544
§ 371 (c)(1),
(2) Date: Sep. 23, 2014

(87) PCT Pub. No.: WO2013/151269
PCT Pub. Date: Oct. 10, 2013

(65) Prior Publication Data
US 2015/0078277 A1   Mar. 19, 2015

Related U.S. Application Data

(60) Provisional application No. 61/618,831, filed on Apr. 1, 2012, provisional application No. 61/623,586, filed on Apr. 13, 2012.

(30) Foreign Application Priority Data

Mar. 21, 2013   (KR) .................. 10-2013-0030263

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04L 5/001* (2013.01)

(58) Field of Classification Search
None
See application file for complete search history.

(56) References Cited

U.S. PATENT DOCUMENTS

| 2009/0088148 A1 | 4/2009 | Chung et al. | |
| 2009/0209247 A1* | 8/2009 | Lee | H04L 5/0007 455/422.1 |

(Continued)

FOREIGN PATENT DOCUMENTS

| JP | 2011-512769 | 4/2011 |
| JP | 2012-028956 | 2/2012 |

(Continued)

OTHER PUBLICATIONS

Panasonic, "Search Space Design for Enhanced PDCCH," 3GPP TSG RAN WG1 Meeting #68, R1-120236, Feb. 2012, 5 pages.

(Continued)

*Primary Examiner* — Benjamin Lamont
(74) *Attorney, Agent, or Firm* — Lee Hong Degerman Kang & Waimey

(57) ABSTRACT

The present invention relates to a method to receive an enhanced physical downlink control channel (EPDCCH) in a wireless communication system. More particularly, the method includes monitoring at least one EPDCCH candidate consisting of one or more enhanced control channel elements (ECCEs) in resource blocks and receiving the EPDCCH, wherein the number of ECCEs forming each of the one or more EPDCCH candidates corresponds to an aggregation level, the number of the EPDCCH candidates is set based on the number of ECCEs for each resource block and the number of resource blocks, and, when the number of resource blocks is a first value and the number of ECCEs for (Continued)

each resource block is a second value, the number of EPDCCH candidates in a specific aggregation level is set as a value obtained by dividing the total number of ECCEs by the specific aggregation level.

4 Claims, 21 Drawing Sheets

(56) References Cited

U.S. PATENT DOCUMENTS

| | | | |
|---|---|---|---|
| 2011/0317615 A1* | 12/2011 | Soong | H04W 72/042 370/315 |
| 2012/0063351 A1* | 3/2012 | Kim | H04L 5/001 370/252 |
| 2012/0213163 A1* | 8/2012 | Lee | H04L 1/1861 370/329 |
| 2013/0003604 A1* | 1/2013 | Blankenship | H04L 5/0053 370/255 |
| 2013/0003663 A1* | 1/2013 | Blankenship | H04L 5/0053 370/329 |
| 2013/0039284 A1* | 2/2013 | Marinier | H04L 5/001 370/329 |
| 2013/0114521 A1* | 5/2013 | Frenne | H04L 5/0053 370/329 |
| 2013/0114522 A1* | 5/2013 | Frenne | H04L 5/0094 370/329 |
| 2013/0163551 A1* | 6/2013 | He | H04W 4/06 370/329 |
| 2013/0194931 A1* | 8/2013 | Lee | H04L 5/0053 370/241 |
| 2013/0195020 A1* | 8/2013 | Frederiksen | H04W 72/042 370/329 |
| 2013/0195068 A1* | 8/2013 | Baker | H04L 5/0023 370/330 |

FOREIGN PATENT DOCUMENTS

| | | | |
|---|---|---|---|
| KR | 10-2009-0033001 | 4/2009 | |
| KR | 10-2009-0089770 | 8/2009 | |
| KR | 10-2010-0123650 | 11/2010 | |
| KR | 10-2011-0134305 | 12/2011 | |
| KR | WO 2011155759 A2 * | 12/2011 | ........... H04L 5/0053 |

OTHER PUBLICATIONS

PCT International Application No. PCT/KR2013/002544, Written Opinion of the International Searching Authority dated Jul. 22, 2013, 1 page.
Ericsson, et al., "Search Spaces for ePDCCH," 3GPP TSG-RAN WG1 #68bis, R1-121022, Mar. 2012, 3 pages.
Fujitsu, "Multiplexing efficiency of ePDCCH," 3GPP TSG RAN WG1 Meeting #68bis, R1-121198, Mar. 2012, 4 pages.
MediaTek Inc., "Search Space Design for ePDCCH," 3GPP TSG-RAN WG1 #68, R1-120630, Feb. 2012, 2 pages.
Sharp, "Partitioning of PRB pair and eCCE structure," 3GPP TSG RAN WG1 Meeting #68, R1-120281, XP050562820, Feb. 2012, 8 pages.
NTT DOCOMO, "Resource Mapping Scheme for E-PDCCH," 3GPP TSG RAN WG1 Meeting #68bis, R1-121477, XP050599758, Mar. 2012, 6 pages.
Research in Motion, et al., "Search Space Design for E-PDCCH," 3GPP TSG RAN WG1 Meeting #68bis, R1-121478, XP050599759, Mar. 2012, 6 pages.
Qualcomm Incoporated, "Reference Signals for e-PDCCH," 3GPP TSG RAN WG1 #68bis, R1-121570, XP050599839, Mar. 2012, 4 pages.
European Patent Office Application Serial No. 13772861.4, Search Report dated Oct. 30, 2015, 8 pages.
Research in Motion, UK Limited, "DMRS Port Assignment for E-PDCCH," 3GPP TSG-RAN WG1 Meeting#68bis, R1-121480, Mar. 2012, 7 pages.
State Intellectual Property Office of the People's Republic of China Application Serial No. 201380018955.3, Office Action dated Dec. 19, 2016, 22 pages.

* cited by examiner

FIG. 2
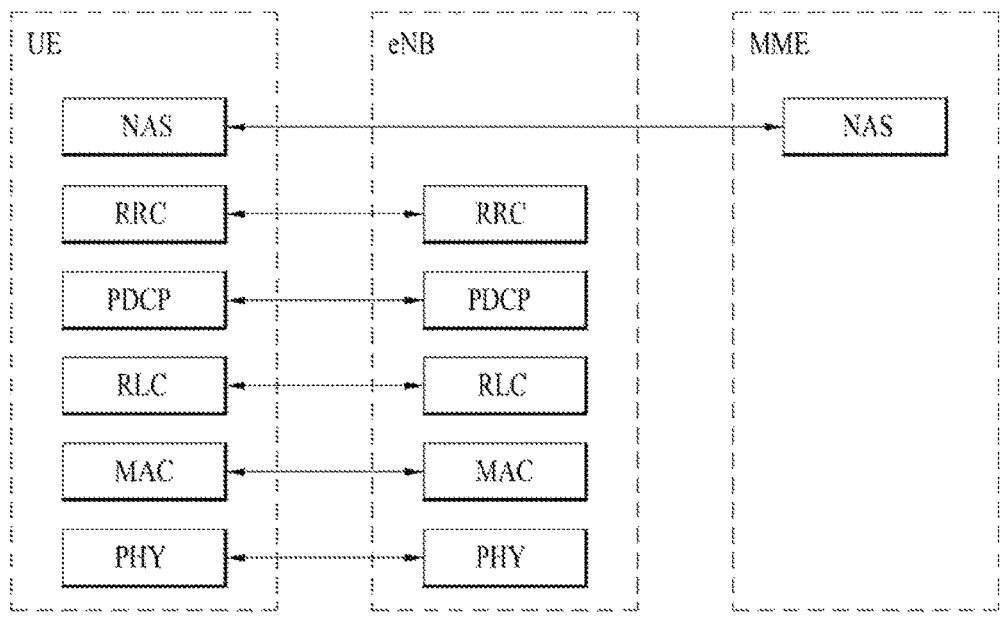
(a) Control-plane protocol stack
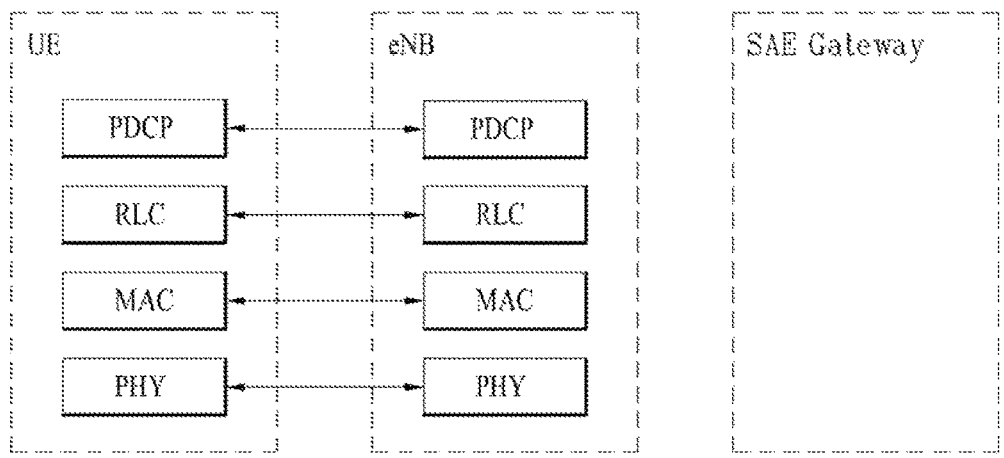
(b) User-plane protocol stack FIG. 5
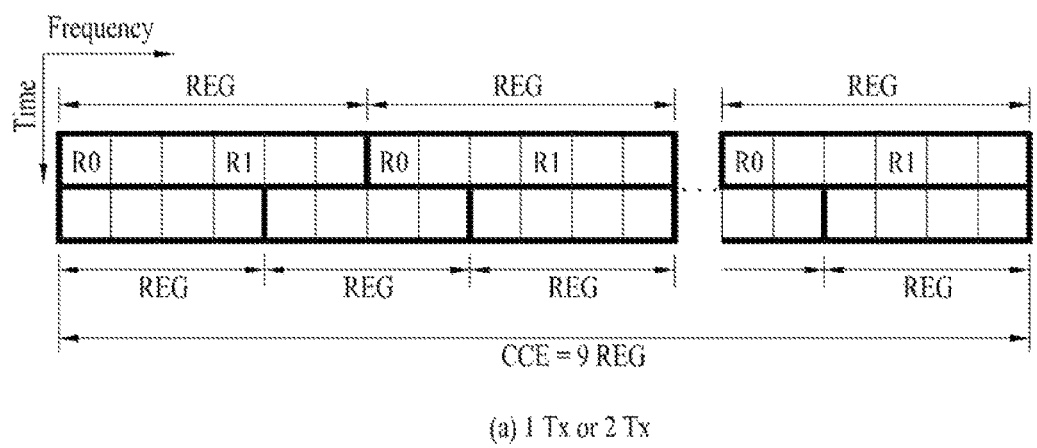
(a) 1 Tx or 2 Tx
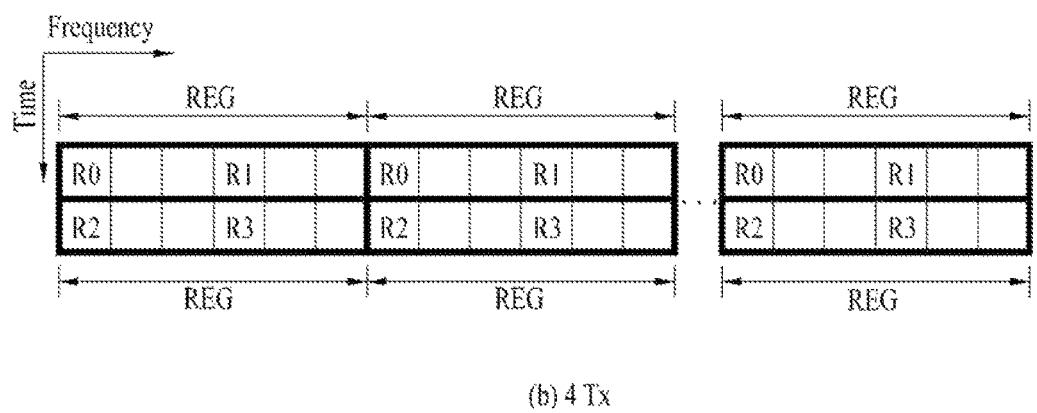
(b) 4 Tx

US 9,609,639 B2

METHOD FOR TRANSCEIVING DOWNLINK CONTROL CHANNEL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2013/002544, filed on Mar. 27, 2013, which claims the benefit of earlier filing date and right of priority to Korean Patent Application No. 10-2013-0030263, filed on Mar. 21, 2013, and also claims the benefit of U.S. Provisional Application Ser. No. 61/618,831, filed on Apr. 1, 2012, and 61/623,586, filed on Apr. 13, 2012, the contents of which are all hereby incorporated by reference herein in their entirety.

TECHNICAL FIELD

The present invention relates to a wireless communication system and, more specifically, to a method for transmitting/receiving a downlink control channel in a wireless communication system and an apparatus therefor.

BACKGROUND ART

A brief description will be given of a $3^{rd}$ Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency region in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency region in which the UE can transmit data, a coding scheme, a data size, HARQ information, etc. by transmitting UL scheduling information to the UE. An interface for transmitting user traffic or control traffic may be used between eNBs. A Core Network (CN) may include an AG and a network node for user registration of UEs. The AG manages UE mobility on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, new technological evolution is required to achieve future competitiveness. Specifically, cost reduction per bit, increased service availability, flexible use of frequency bands, simplified structure, an open interface, appropriate power consumption of UEs, etc. are required.

DISCLOSURE

Technical Problem

An object of the present invention devised to solve the problem lies in a method for transmitting/receiving a downlink control channel in a wireless communication system.

Technical Solution

In an aspect of the present invention, a method for receiving an EPDCCH (Enhanced Physical Downlink Control Channel) from a base station by a user equipment (UE) in a wireless communication system, the method including: monitoring at least one EPDCCH candidate comprising one or more enhanced control channel elements (ECCEs) in resource blocks for the EPDCCH and receiving the EPDCCH, wherein a number of ECCEs forming each of the at least one EPDCCH candidate corresponds to an aggregation level, wherein a number of the at least one EPDCCH candidate is defined based on a number of ECCEs per resource block and a number of the resource blocks, wherein, when the number of the resource blocks is a first value and the number of ECCEs per resource block is a second value, the number of the at least one EPDCCH candidate at a specific aggregation level is defined as a value obtained by dividing a total number of ECCEs by the specific aggregation level.

When the number of resource blocks is not the first value or the number of ECCEs per resource block is not the second value, the number of the at least one EPDCCH candidate at the specific aggregation level may be set to a predefined value.

In another aspect of the present invention, provided herein is a UE in a wireless communication system, including: a processor configured to obtain an EPDCCH by monitoring at least one EPDCCH candidate composed of one or more enhanced control channel elements (ECCEs) in resource blocks for the EPDCCH, wherein a number of ECCEs forming each of the at least one EPDCCH candidate corresponds to an aggregation level, wherein the processor is configured to set the number of the at least one EPDCCH candidate on the basis of a number of ECCEs per resource block and a number of the resource blocks, the processor being configured to set the number of the at least one EPDCCH candidate at a specific aggregation level as a value obtained by dividing a total number of ECCEs by the specific aggregation level when the number of the resource blocks is a first value and the number of ECCEs per resource block is a second value.

The processor may be configured to set the number of the EPDCCH candidates at the specific aggregation level to a predefined value when the number of resource blocks is not the first value or the number of ECCEs per resource block is not the second value.

In the above-described embodiments, the total number of ECCEs may be represented as a product of the first value and the second value, the first value may be 2 and the second value may be 4. The aggregation level may be one of 1, 2, 4 and 8.

The number of ECCEs per resource block may be 2 or 4.

In another aspect of the present invention, provided herein is a method for receiving an EPDCCH from a base station by a UE in a wireless communication system, the method including: monitoring at least one EPDCCH candidate comprising one or more ECCEs in resource blocks for the EPDCCH and receiving the EPDCCH, wherein a number of ECCEs forming each of the at least one EPDCCH candidate corresponds to an aggregation level, wherein a number of the at least one EPDCCH candidate is set on the basis of a number of ECCEs per resource block and a number of the resource blocks, wherein, when a total number of ECCEs included in the resource blocks is insufficient to generate a predetermined number of EPDCCH candidates for a specific aggregation level, a number of EPDCCH candidates for an aggregation level lower than the specific aggregation level is increased and the number of EPDCCH candidates for the specific aggregation level is reduced.

Advantageous Effects

According to embodiments of the present invention, a downlink control channel can be efficiently transmitted and received in a wireless communication system.

The effects of the present invention are not limited to the above-described effects and other effects which are not described herein will become apparent to those skilled in the art from the following description.

DESCRIPTION OF DRAWINGS

FIG. 2 illustrates a control-plane protocol stack and a user-plane protocol stack in a radio interface protocol architecture conforming to a 3GPP radio access network standard between a UE and an E-UTRAN;

FIG. 5 illustrates resource units used to configure a downlink control channel in LTE;

BEST MODE

Figure 1:
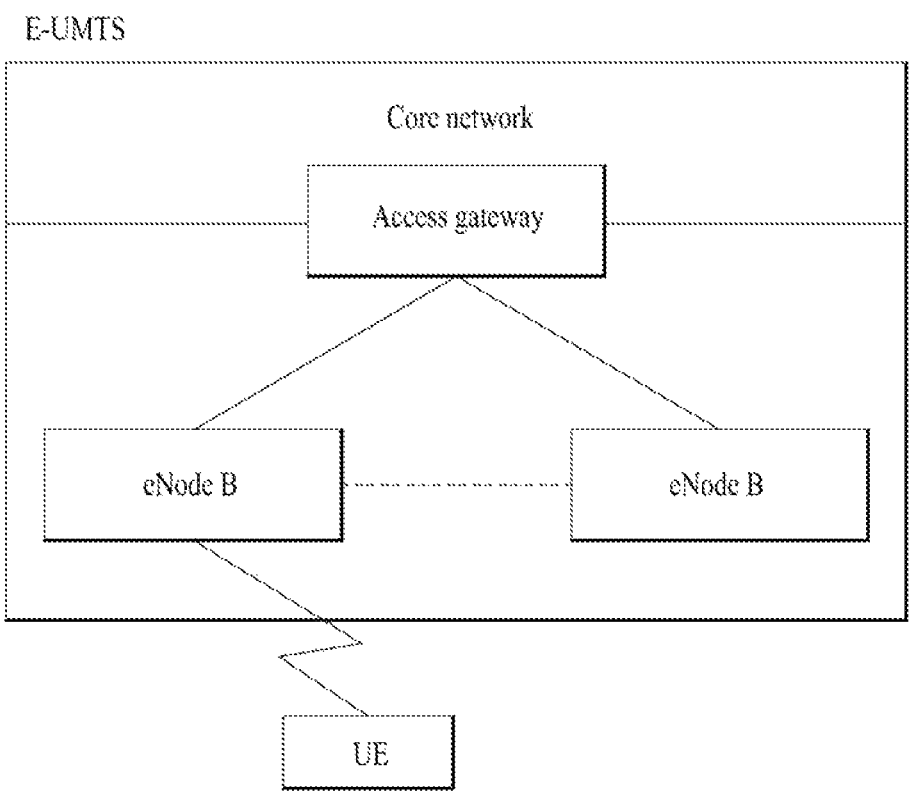
FIG. 1 illustrates a configuration of an E-UMTS network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to 3GPP.

While embodiments of the present invention are described in the context of LTE and LTE-A, these embodiments are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

FIG. 2 illustrates control-plane and user-plane protocol stacks in a radio interface protocol architecture conforming to a 3GPP wireless access network standard between a UE and an E-UTRAN. The control plane is a path along which the UE and the E-UTRAN transmit control messages to manage calls, and the user plane is a path along which data generated from an application layer, for example, voice data or Internet packet data is transmitted.

A physical (PHY) layer at Layer 1 (L1) provides information transfer service to a higher layer using physical channels. The PHY layer is connected to a medium access control (MAC) layer, which is a higher layer, via transport channels (transantenna port channels). The transport channels deliver data between the MAC layer and the PHY layer. Data is transmitted on physical channels between the PHY layers of a transmitter and a receiver. The physical channels use time and frequency as radio resources. Specifically, the physical channels are modulated using Orthogonal Frequency Division Multiple Access (OFDMA) for downlink and using Single Carrier Frequency Division Multiple Access (SC-FDMA) for uplink.

The MAC layer at Layer 2 (L2) provides service to a higher layer, i.e. a Radio Link Control (RLC) layer, via logical channels. The RLC layer at L2 supports reliable data transmission. RLC functionality may be implemented in a functional block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths.

DL transport channels used to deliver data from the network to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
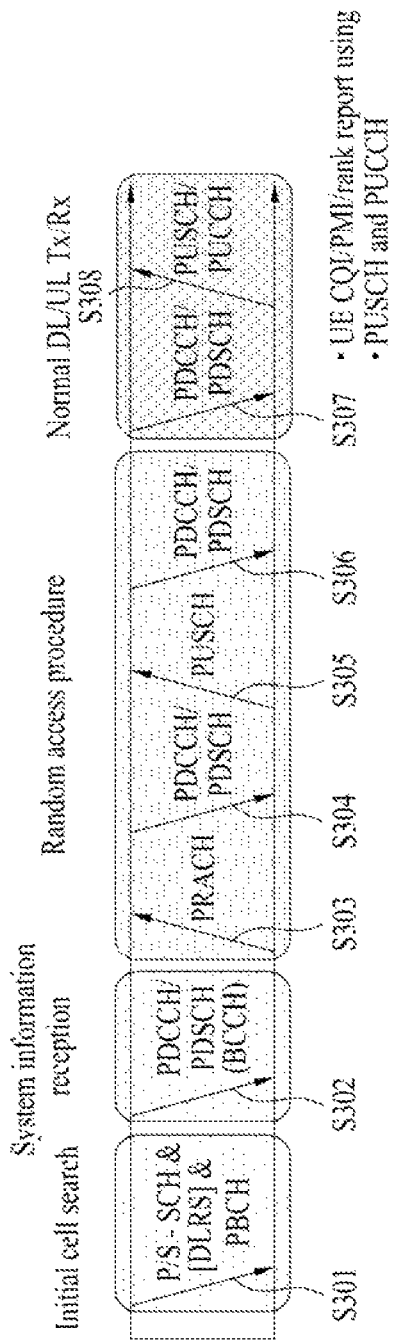
FIG. 3 illustrates physical channels used in a 3GPP system and a general signal transmission method using the physical channels.

FIG. 3 illustrates physical channels used in 3GPP and a general method for transmitting signals on the physical channels.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During initial cell search, the UE may monitor a DL channel state by receiving a DownLink Reference Signal (DL RS).

After initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on UL or receives from the eNB on DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In 3GPP LTE, the UE may transmit control information such as a CQI, a PMI, an RI, etc. on a PUSCH and/or a PUCCH.

Figure 4:
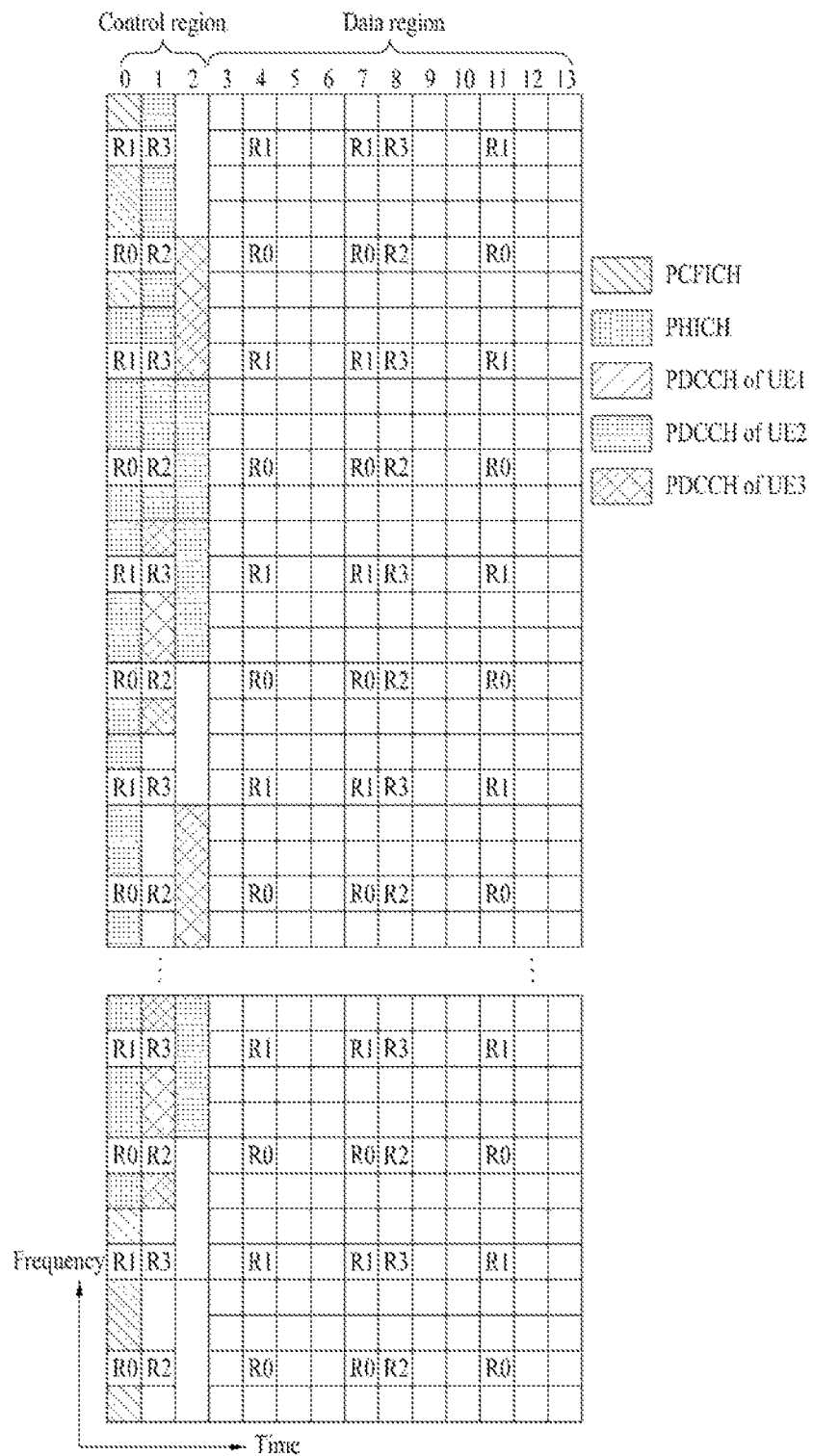
FIG. 4 illustrates a structure of a downlink radio frame used in LTE.

FIG. 4 illustrates control channels included in the control region of a subframe in a downlink radio frame.

Referring to FIG. 4, a subframe includes 14 OFDM symbols. A control region occupies the first one to three OFDM symbols and a data region occupies the other 13 to 11 OFDM symbols in the subframe according to the configuration of the subframe. In FIG. 4, reference characters R1 to R4 denote Reference Signals (RSs) or pilot signals for antenna 0 to antenna 3. RSs are transmitted in a predetermined pattern within a subframe irrespective of the control region and the data region of the subframe. Control channels are allocated to resources unused for RSs in the control region, and traffic channels are allocated to resources unused for RSs in the data region. The control channels of the control region are a Physical Control Format Indicator Channel (PCFICH), a Physical Hybrid-ARQ Indicator Channel (PHICH), a Physical Downlink Control Channel (PDCCH), etc.

The PCFICH indicates the number of OFDM symbols used for PDCCHs in every subframe to UEs. The PCFICH is located in the first OFDM symbol and configured with priority over the PHICH and the PDCCHs. The PCFICH includes four Resource Element Groups (REGs), each REG being distributed across the control region based on a cell Identity (ID). One REG has four REs. An RE is a minimum physical resource defined as one subcarrier by one OFDM symbol. A PCFICH value, which is modulated using Quadrature Phase Shift Keying (QPSK), ranges from 1 to 3 or from 2 to 4 according to a bandwidth.

The PHICH carries HARQ ACK/NACK for uplink transmission. That is, the PHICH is a channel used to deliver HARQ ACK/NACK for uplink HARQ. The PHICH includes one REG and is scrambled cell-specifically. The ACK/NACK is indicated in one bit and modulated using Binary Phase Shift Keying (BPSK). The modulated ACK/NACK is spread with a Spreading Factor (SF) of 2 or 4. A plurality of PHICHs is mapped to the same resources form a PHICH group. The number of PHICHs multiplexed into a PHICH group is determined according to the number of spreading codes. The same PHICH (group) occurs three times to achieve a diversity gain in the frequency and/or time domain.

A PDCCH is allocated to the first n OFDM symbols of a subframe. Here, n is 1 or a larger integer indicated by the PCFICH. The PDCCH includes one or more Control Channel Elements (CCEs). The PDCCH is used to inform a UE or a UE group of the resource allocation of transport channels, namely a PCH and a DownLink SCH (DL-SCH), an uplink scheduling grant, and HARQ information. The PCH and the DL-SCH are transmitted on a PDSCH. Therefore, the eNB and the UE transmit and receive data on a PDSCH except for particular control information or service data.

Information about the destination (one or more UEs) of data of a PDSCH and information about how the UEs should receive and decode the PDSCH data is delivered on a PDCCH. For example, if the Cyclic Redundancy Check (CRC) of a particular PDCCH is masked by Radio Network Temporary Identity (RNTI) "A" and information about data transmitted in radio resources "B" (e.g. a frequency position) with DCI format "C" being a transport format (e.g. a Transport Block (TB) size, a modulation scheme, coding information, etc.) is transmitted in a particular subframe, then UEs within the cell of the eNB monitor the PDCCH using their RNTI information. If one or more UEs have RNTI "A", then the UEs receive the PDCCH and receive a PDSCH indicated by "B" and "C" based on the received information of the PDCCH.

FIG. 5 illustrates resource units used to configure a downlink control channel in LTE. FIG. 5(a) shows a case in which the number of transmit (Tx) antennas is 1 or 2 and FIG. 5(b) shows a case in which the number of Tx antenna is 4. Although a different RS pattern is used according to the number of Tx antennas, REs are configured for a DL control channel in the same manner.

Referring to FIG. 5, a basic resource unit of a DL control channel is an REG. The REG includes four contiguous REs except for REs carrying RSs. REGs are marked with bold lines in FIG. 5. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor $M^{(L)}$ ($\geq L$) CCEs that are arranged contiguously or according to a predetermined rule. L that the UE should consider for PDCCH reception may be a plural value. CCE sets that the UE should monitor to receive a PDCCH are referred to as a search space. For example, LTE defines search spaces as illustrated in Table 1.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 6:
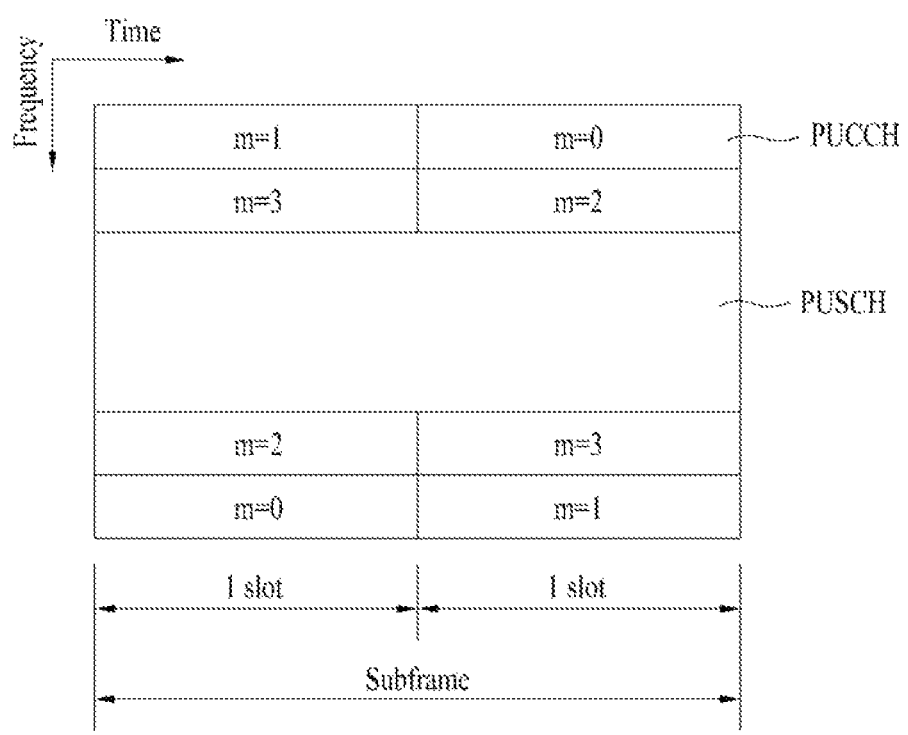
FIG. 6 illustrates a structure of an uplink subframe used in LTE.

FIG. 6 illustrates a structure of a UL subframe in LTE.

Referring to FIG. 6, a UL subframe may be divided into a region to which a physical uplink control channel (PUCCH) carrying control information is allocated and a region to which a physical uplink shared channel (PUSCH) carrying user data is allocated. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, and a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

Figure 7:
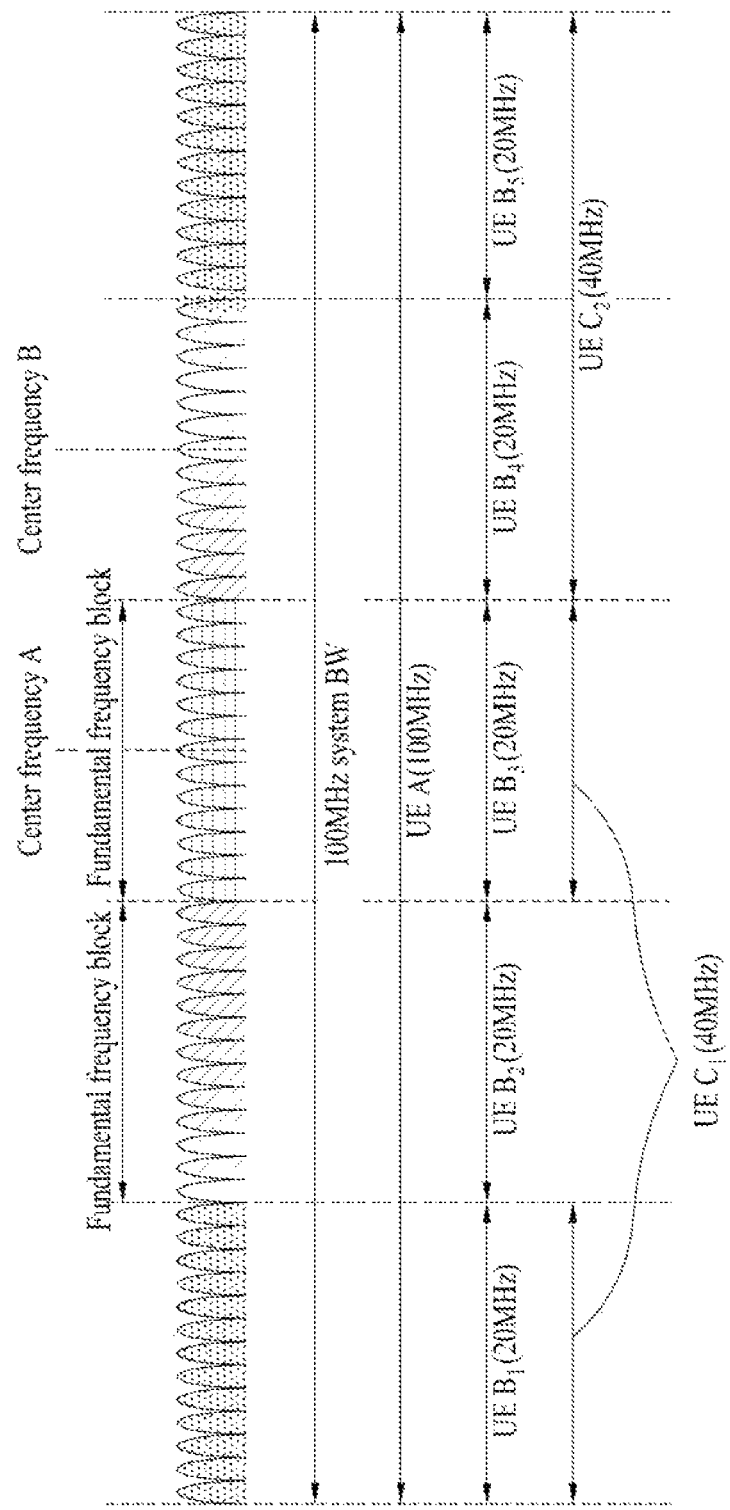
FIG. 7 illustrates carrier aggregation.

FIG. 7 illustrates carrier aggregation.

Carrier aggregation refers to a scheme in which a UE uses a plurality of frequency blocks or (logical) cells composed of UL resources (or component carriers) and/or DL resources (or component carriers) as one wider logical frequency band. According to carrier aggregation, a wireless communication can use a use a wider frequency band. Resources are represented by the term "component carrier" for convenience of description in the following.

Referring to FIG. 7, system bandwidth (BW) is a logical band having a bandwidth of up to 100 MHz. The system bandwidth includes 5 component carriers each of which has a bandwidth of up to 20 MHz. A component carrier includes one or more physically contiguous subcarriers. While the component carriers have the same bandwidth in FIG. 7, the component carriers may have different bandwidths. Furthermore, while the component carriers are contiguous in the frequency domain, FIG. 7 illustrates the logical concept and thus the component carriers may be physically contiguous or separated.

Different center frequencies may be respectively used for the component carriers or a common center frequency may be used for physically contiguous component carriers. For example, if all component carriers are physically contiguous in FIG. 7, then a center frequency A can be used. When the component carriers are not physically contiguous, center frequencies A and B may be used.

A component carrier may correspond to the system bandwidth of a legacy system in the specification. It is possible to easily provide backward compatibility and facilitate system design in a wireless communication environment in which an enhanced UE and a legacy UE coexist by defining the component carrier on the basis of the legacy system. For example, when an LTE-A system supports carrier aggregation, each component carrier can correspond to the system bandwidth of an LTE system. In this case, a component carrier can have one of the bandwidths of 1.25, 2.5, 5, 10 and 20 MHz.

When total system bandwidth is extended according to carrier aggregation, 100 MHz can be used for communication with each UE and communication is performed using all 5 component carriers. UEs $B_1$ to $B_5$ may use only the bandwidth of 20 MHz and perform communication using one component carrier. UEs $C_1$ and $C_2$ may use 40 MHz and performs communication using two component carriers, respectively. These two component carriers may be logically/physically contiguous or noncontiguous. UE $C_1$ corresponds to a case in which two noncontiguous component carriers are used and UE $C_2$ corresponds to a case in which two contiguous component carriers are used.

One DL component carrier and one UL component carrier are used in LTE, whereas a plurality of component carriers may be used in LTE-A, as shown in FIG. 6. Methods for a control channel to schedule a data channel can be divided into linked carrier scheduling and cross carrier scheduling.

More specifically, according to linked carrier scheduling, a control channel transmitted through a specific component carrier schedules only a data channel through the specific component carrier as in the LTE system which uses a single component carrier.

According to cross carrier scheduling, a control channel transmitted through a primary component carrier (CC) schedules a data channel transmitted through the primary CC or another CC using a carrier indicator field (CIF).

In the current wireless communication environment, data throughput for a cellular network is rapidly increasing with the emergence and propagation of various devices requiring M2M (machine-to-machine) communication and high data throughput. To meet high data throughput, communication technology evolves to carrier aggregation for enabling efficient use of a larger number of frequency bands, MIMO for increasing data capacity within a limited frequency band, and coordinated multi-point (CoMP) and communication environments evolves to environments in which the density of accessible nodes around a UE increases. A system having high-density nodes can show higher system performance according to cooperation among nodes. This scheme provides much higher performance than a scheme in which nodes operate as independent base stations (BSs) (which may be called advanced BSs (ABSs), Node-Bs (NBs), eNode-Bs (eNBs), access points (APs), etc.).

Figure 8:
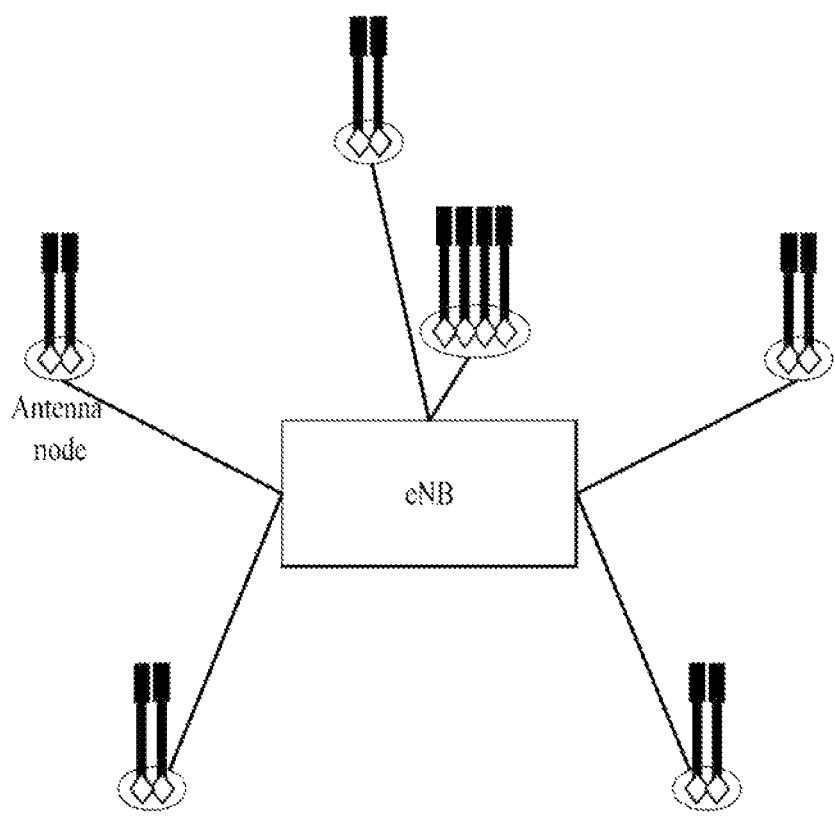
FIG. 8 illustrates a multi-node system from among next-generation communication systems.

FIG. 8 illustrates a multi-node system from among next-generation communication systems.

Referring to FIG. 8, when transmission and reception of all nodes are managed by one controller and thus the nodes operates as an antenna group of one cell, the system can be regarded as a distributed multi-node system (DMNS) which forms one cell. The individual nodes may be assigned respective node IDs or may operate as antennas in the cell without having node IDs. However, if the nodes have different cell identifiers IDs, then the system can be regarded as a multi-cell system. When multiple cells are configured in an overlapping manner according to coverage, this is called a multi-tier network.

A Node-B, eNode-B, PeNB, HeNB, RRH (Remote Radio Head), relay and distributed antenna can be a node and at least one antenna is installed in one node. A node may be called a transmission point. While nodes generally refer to a group of antennas spaced by a predetermined distance or more, nodes can be applied to the present invention even if the nodes are defined as an arbitrary antenna group irrespective of distance.

With the introduction of the aforementioned multi-node system and relay nodes, various communication schemes can be applied to improve channel quality. To apply MIMO and CoMP to multi-node environments, however, introduction of a new control channel is needed. Accordingly, an enhanced PDCCH (EPDCCH) is newly introduced as a control channel. The EPDCCH is allocated to the data region (referred to as a PDSCH region hereinafter) instead of the control region (referred to as a PDCCH region). Since control information about a node can be transmitted to each UE through the EPDCCH, PDCCH region shortage can be solved. For reference, the EPDCCH is not provided to legacy UEs and can be received only by LTE-A UEs. In addition, the EPDCCH is transmitted and received on the basis of a DM-RS (or CSI-RS) instead of a CRS corresponding to a cell-specific reference signal.

Figure 9:
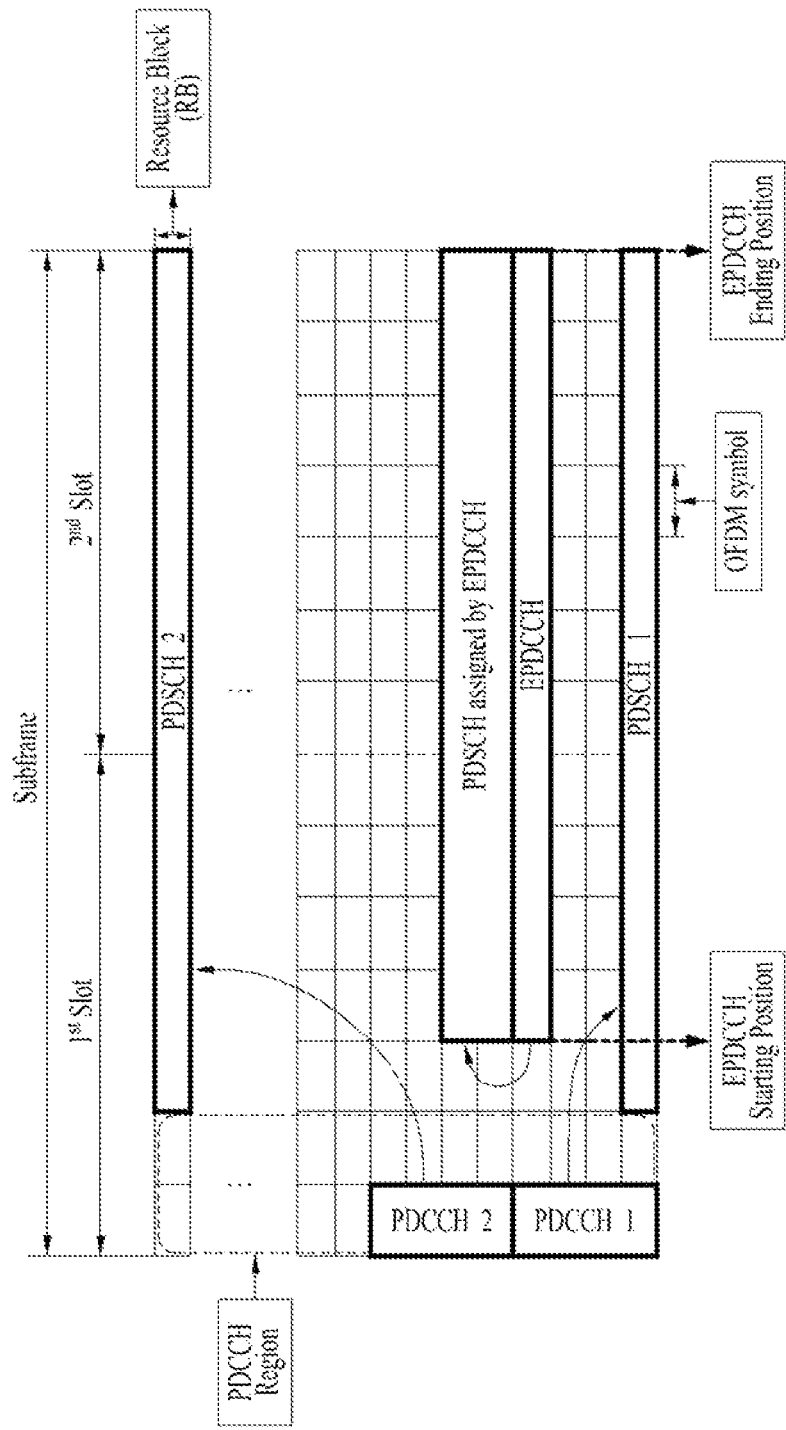
FIG. 9 illustrates an EPDCCH and a PDSCH scheduled by the EPDCCH.

FIG. 9 illustrates an example of an EPDCCH and a PDSCH scheduled by the EPDCCH.

Referring to FIG. 9, PDCCH 1 and PDCCH 2 respectively schedule PDSCH 1 and PDSCH 2 and the EPDCCH schedules another PDSCH. FIG. 9 shows that the EPDCCH is transmitted, starting from the fourth symbol of the corresponding subframe to the last symbol.

EPDCCHs can be transmitted through the PDSCH region used to transmit data and a UE monitors EPDCCHs in order to detect presence or absence of an EPDCCH destined therefor. That is, to obtain DCI included in the EPDCCH, the UE needs to perform blind decoding for a predetermined number of EPDCCH candidates in a search space with aggregation level L. Like the aggregation level of the search space for the PDCCH, the aggregation level of the search space for the EPDCCH refers to the number of enhanced CCE (ECCEs) used to transmit DCI.

A description will be given of a case in which the UE respectively assumes 6, 6, 2 and 2 EPDCCH candidates for aggregation levels #1, #2, #4 and #8 and detects a PDCCH. However, the present invention is not limited thereto and is applicable to a case in which a different number of EPDCCH candidates are detected.

The EPDCCH is transmitted using a specific RB set, distinguished from the PDCCH. Particularly, an RB set through which the EPDCCH can be transmitted is preferably limited in order to reduce control channel overhead and to avoid resource collision with the PDSCH. Accordingly, an eNB can signal an RB set through which the EPDCCH can be transmitted to the UE through a higher layer signal and the UE can attempt detection on the assumption that the EPDCCH is transmitted only within the signaled RBs.

In general, the number of REs used to transmit DCI in a PRB pair corresponding to a combination of first and second slots having the same PRB index is considerably large. Accordingly, it is desirable to divide one PRB pair into a plurality of resource sets and transmit the EPDCCH by appropriately using the resource sets. For example, one PRB pair can be divided into 4 resource sets and each resource set can be regarded as one ECCE. In this case, the EPDCCH corresponding to aggregation level L is transmitted using L ECCEs. Otherwise, one PRB pair can be divided into 8 resource sets, every two resource sets can be grouped into one ECCE and the EPDDCH corresponding to aggregation level L can be transmitted using L ECCEs. In this case, resource sets belonging to different PRB pairs may form one ECCE for frequency diversity.

The number of EPDCCH candidates is preferably maintained to be identical to the number of PDCCH candidates in order to reuse a blinding decoding circuit for the PDCCH. If a sufficient number of PRB pairs is set and thus EPDCCH candidates for respective aggregation levels can be configured such that the EPDCCH candidates do not overlap, then 6, 6, 2 and 2 EPDCCH candidates, which correspond to the number of PDCCH candidates, are respectively assumed for aggregation levels #1, #2, #4 and #8 and the EPDCCH is detected.

Figure 10:
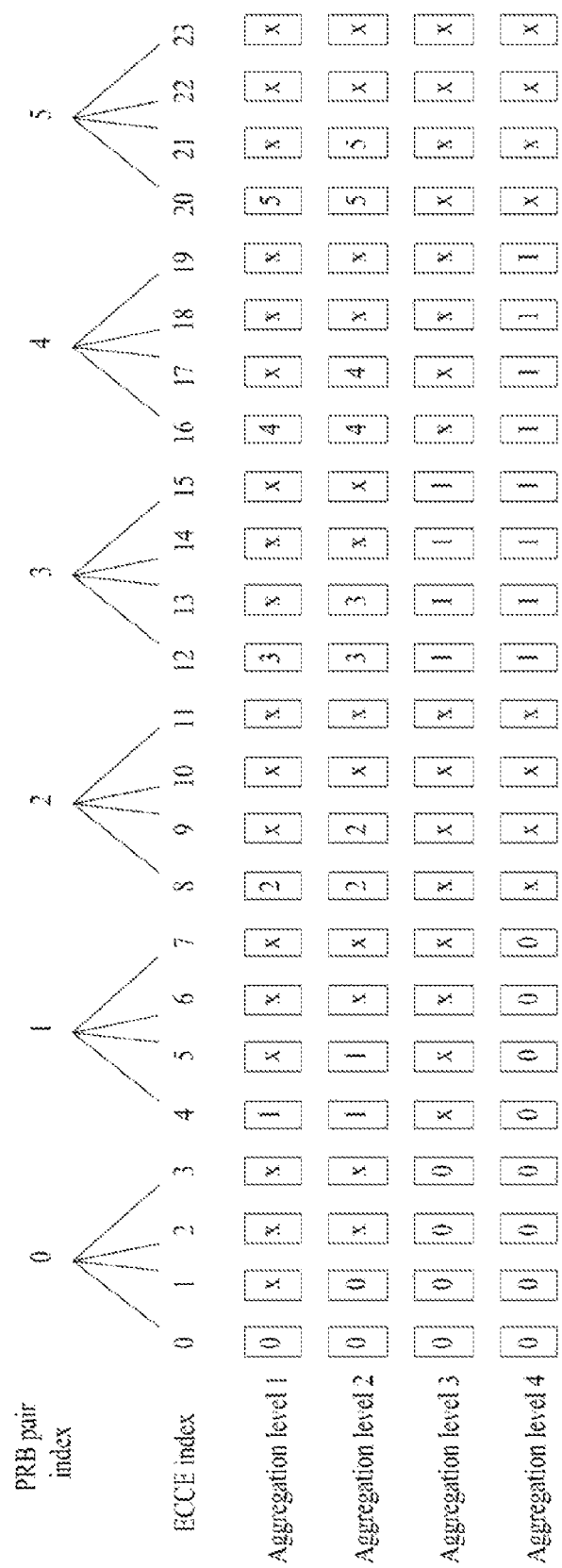
FIG. 10 illustrates EPDCCH candidates configured in 6 PRB pairs for blind decoding of an EPDCCH according to an embodiment of the present invention.

FIG. 10 illustrates EPDCCH candidates configured in 6 PRB pairs for blind decoding of an EPDCCH according to an embodiment of the present invention.

Referring to FIG. 10, 6 PRB pairs are set for the EPDCCH and one PRB pair is divided into 4 ECCEs. The PRB pairs may be contiguous or distributed. EPDCCH candidates corresponding to aggregation level #1 may be located in different PRB pairs to increase frequency selective diversity during EPDCCH transmission.

In FIG. 10, positions of EPDCCH candidates at each aggregation level are determined such that the EPDCCH candidates are spaced as far apart as possible. For example, since two EPDCCH candidates are present in the case of aggregation level #4, the two EPCCH candidates are respectively located in PRB pairs #0 and #3 having a spacing of 2 PRB pairs therebetween.

Figure 11:
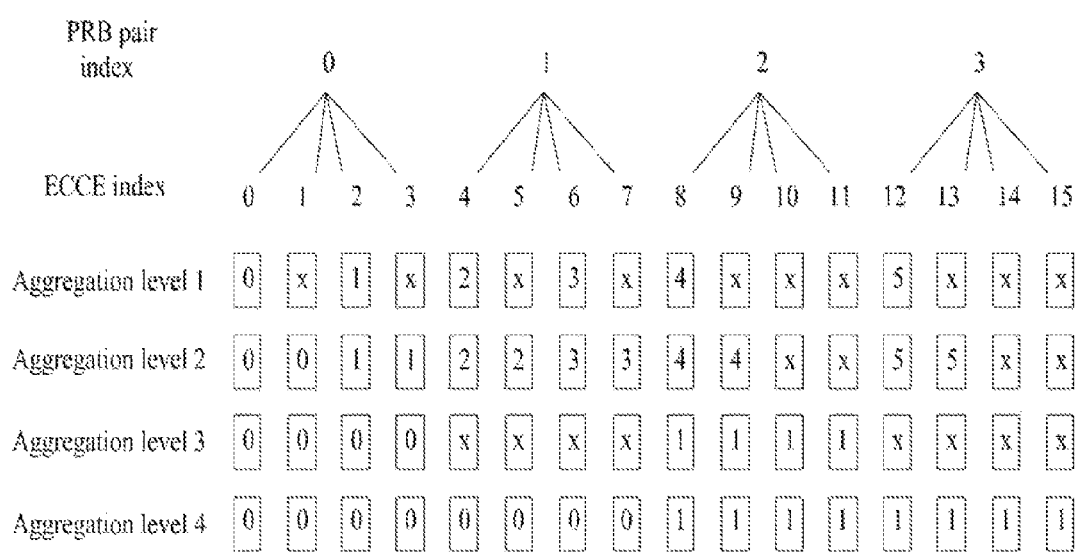
FIG. 11 illustrates EPDCCH candidates configured in 4 PRB pairs for blind decoding of an EPDCCH according to an embodiment of the present invention.

FIG. 11 illustrates EPDCCH candidates configured in 4 PRB pairs for blind decoding of an EPDCCH according to an embodiment of the present invention.

Referring to FIG. 11, 4 PRB pairs are set and two EPDCCH candidates at aggregation level #1 are configured for some PRB pairs such that 6 EPDCCH candidates are configured for 4 PRB pairs. In FIG. 11, two EPDCCH candidates at aggregation level #1 are present in PRB pairs #0 and #1.

In addition, the spacing between the EPDCCH candidates at aggregation level #1 is reduced compared to that in FIG. 10. More specifically, the spacing between EPDCCHs #0 and #1 is 4 ECCEs in the case of FIG. 10, which uses a larger number of PRB pairs (that is, the index of EPDCCH candidate #1 is determined as 'index of EPDCCH candidate #0+4'), whereas the spacing between EPDCCHs #0 and #1 is 2 ECCEs in the case of FIG. 11, which uses a smaller number of PRB pairs. This can be implemented by adjusting the spacing between EPDCCH candidates according to the number of PRB pairs set to the EPDCCH and the number of ECCEs configured in one PRB pair.

For example, when N PRB pairs are set while K ECCEs are formed per PRB pair, a total of K·N ECCEs is configured. Accordingly, EPDCCH candidate spacing at aggregation level #L can be determined by Equation 1.

$$X = \frac{K \cdot N}{M^{(L)}}$$ [Equation 1]

In Equation 1, $M^{(L)}$ denotes the number of EPDCCH candidates at aggregation level #L. To integerize the number of EPDCCH candidates, a function such as floor(X), ceil(X) or the like may be applied. floor(X) represents a maximum integer equal to or less than X and ceil(X) represents a minimum integer equal to or greater than X.

Figure 12:
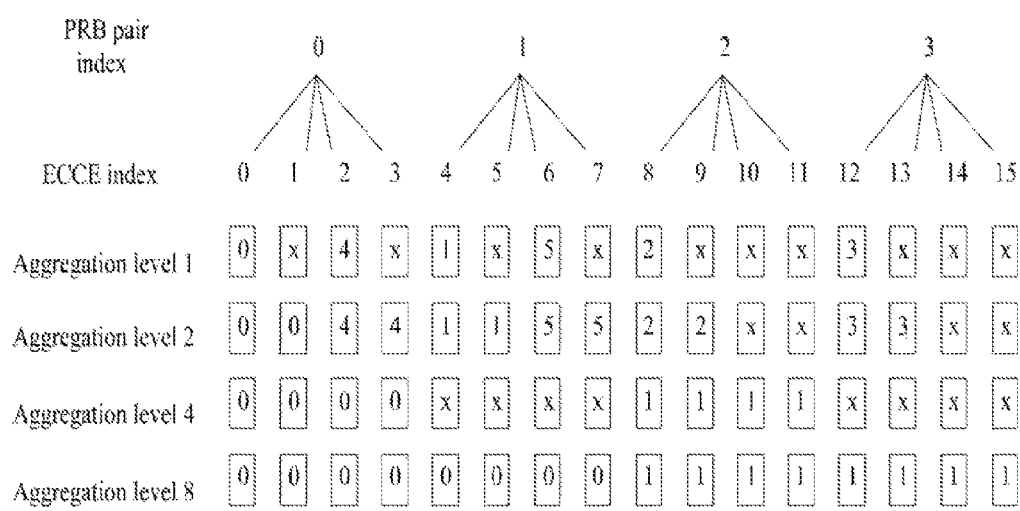
FIG. 12 illustrates EPDCCH candidates configured in 4 PRB pairs for blind decoding of an EPDCCH according to an embodiment of the present invention.

FIG. 12 illustrates another example of EPDCCH candidates configured in 4 PRB pairs for blind decoding of an EPDCCH according to an embodiment of the present invention.

Referring to FIG. 12, EPDCCH candidates at aggregation level #1 are respectively configured in the PRB pairs with a specific spacing (e.g. 4 ECCEs) and, upon configuration of EPDCCH candidates in all PRB pairs, EPDCCH candidates are configured with the specific spacing in positions having an offset from the initial ECCE index.

Specifically, EPDCCH candidates #0, #1, #2 and #3 at aggregation level #1 are respectively formed in PRB pairs #0, #1, #2 and #3 with a spacing of 4 ECCEs. Since all the set PRB pairs are assigned the EPDCCH candidates although two EPDCCH candidates still remain, a predetermined offset, for example, 2 ECCEs is applied to ECCEs and then the remaining EPDCCH candidates #4 and #5 are formed with the spacing of 4 ECCEs. Here, the offset is set to 2 ECCEs corresponding to half of 4 ECCEs in order to uniformly distribute the EPDCCH candidates of aggregation level #1 even in one PRB pair.

When the number of PRB pairs is further reduced for the EPDCCH, resources for transmitting EPDCCH candidates of some high aggregation levels may be insufficient. For example, when 4 ECCEs are configured per PRB pair, two EPDCCH candidates at aggregation level 8 cannot be configured if the number of PRB pairs set for the EPDCCH is less than 4. A description will be given of a method for solving this problem.

Figure 13:
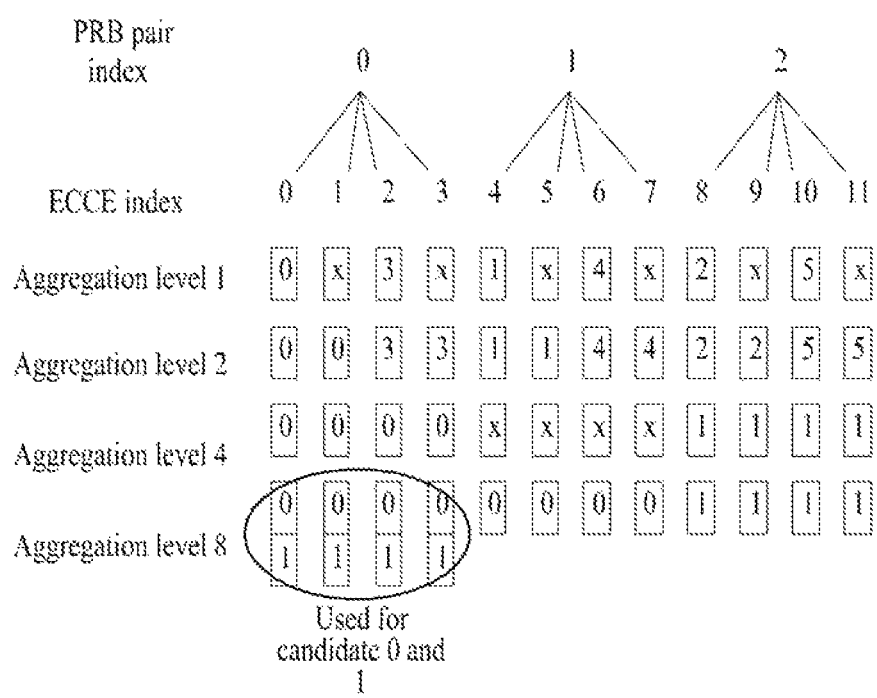
FIG. 13 illustrates EPDCCH candidates configured in 3 PRB pairs for blind decoding of an EPDCCH according to an embodiment of the present invention.

FIG. 13 illustrates EPDCCH candidates configured in 3 PRB pairs for blind decoding of an EPDCCH according to an embodiment of the present invention.

Referring to FIG. 13, some ECCEs are repeatedly allocated to a plurality of EPDCCH candidates. That is, since 3 PRB pairs are allocated in FIG. 13, ECCEs corresponding to PRB #0 are repeatedly used for EPDCCH candidates #0 and #1 at aggregation level #8.

Another method is to consider that there is no EPDCCH candidate having insufficient resources. That is, the UE does not perform blind decoding for EPDCCH candidates having ECCEs overlapping with other EPDCCH candidates. In this case, the number of blind decoding operations of the UE is reduced and thus the blind decoding capability can be used to blind-decode other EPDCCH candidates, particularly, EPDCCH candidates at a low aggregation level. In other words, blind decoding capability of a high aggregation level having a problem is used to blind-decode EPDCCH candidates at a low aggregation level. As a result, the number of EPDCCH candidates per aggregation level can be changed.

Figure 14:
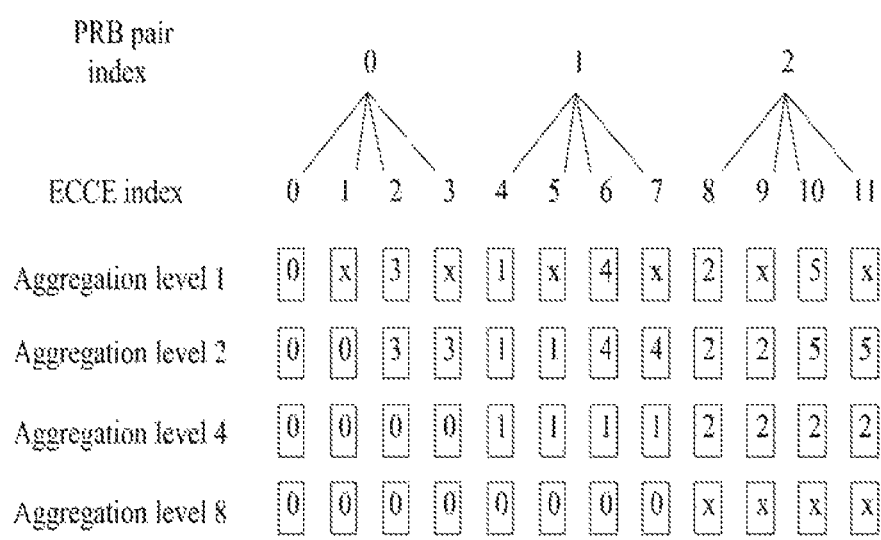
FIG. 14 illustrates EPDCCH candidates configured in 3 PRB pairs for blind decoding of an EPDCCH according to an embodiment of the present invention.

FIG. 14 illustrates another example of EPDCCH candidate configuration in 3 PRB pairs for blind decoding of an EPDCCH according to an embodiment of the present invention.

Referring to FIG. 14, one of EPDCCH candidates corresponding to aggregation level #8 is removed and one EPDCCH candidate is added to EPDCCH candidates corresponding to aggregation level #4 such that 6, 6, 3 and 1 EPDCCH candidates are respectively configured for aggregation levels #1, #2, #4 and #8. In this case, blind decoding capability for aggregation level #8 having a reduced number of EPDCCH candidates may be used to increase the number of EPDCCH candidates of aggregation level #1 or #2 by one.

Alternatively, when set PRB pairs are insufficient to configure all EPDCCH candidates at a specific aggregation level, it may be assumed that EPDCCH candidates corresponding to the corresponding to aggregation level are not present. Instead, the number of EPDCCH candidates of another aggregation level may be increased so as to maintain a total number of blind decoding operations.

Figure 15:
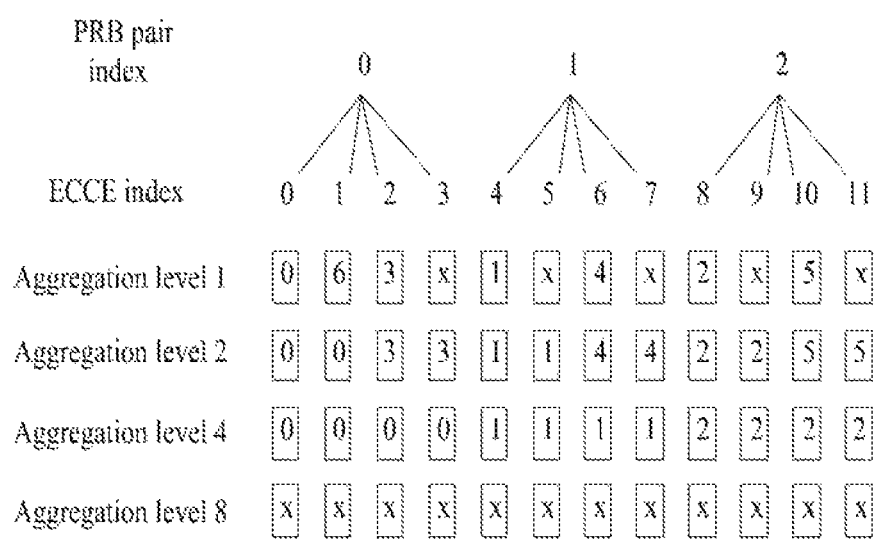
FIG. 15 illustrates EPDCCH candidates configured in 3 PRB pairs for blind decoding of an EPDCCH according to an embodiment of the present invention.

FIG. 15 illustrates another example of EPDCCH candidates configured in 3 PRB pairs for blind decoding of an EPDCCH according to an embodiment of the present invention.

Referring to FIG. 15, EPDCCH candidates corresponding to aggregation level #8 are not present and one EPDCCH candidate is added to each of aggregation levels #1 and #4. Accordingly, the numbers of EPDCCH candidates of aggregation levels #1, #2, #4 and #8 are 7, 6, 3 and 0, respectively. Similarly, the number of EPDCCH candidates corresponding to aggregation level #1 may be increased by two so as to respectively configure 8, 6, 2 and 0 EPDCCH candidates for aggregation levels #1, #2, #4 and #8.

A description will be given of a method for configuring EPDCCH candidates in 2 PRB pairs for blind decoding of an EPDCCH.

Figure 16:
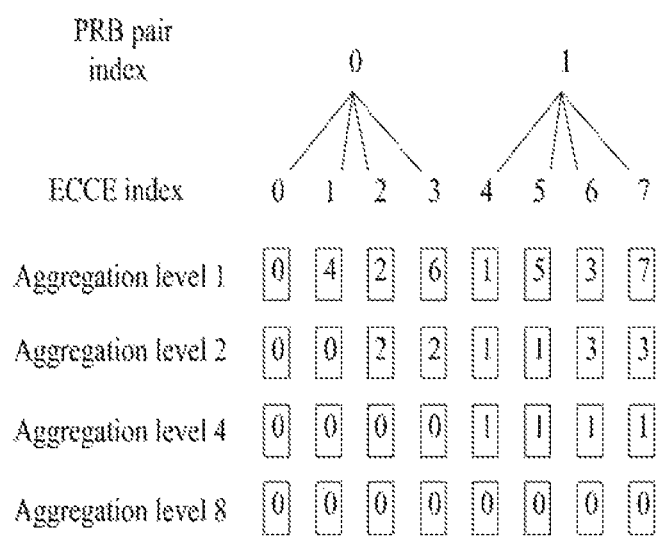
FIG. 16 illustrates EPDCCH candidates configured in 2 PRB pairs for blind decoding of an EPDCCH according to an embodiment of the present invention.

FIG. 16 illustrates EPDCCH candidates configured in 2 PRB pairs for blind decoding of an EPDCCH according to an embodiment of the present invention.

Referring to FIG. 16, the numbers of EPDCCH candidates configured in 2 PRB pairs, which respectively correspond to aggregation levels #1, #2, #4 and #8, are 8, 4, 2 and 1, respectively. In this case, although a maximum number of EPDCCH candidates are configured at every aggregation level, blind decoding capability corresponding to one blind decoding still remains. Specifically, while 16 blind decodings corresponding to 6, 6, 2 and 2 EPDCCH candidates are required for aggregation levels #1, #2, #4 and #8 in a conventional scheme, 8, 4, 2 and 1 EPDCCH candidates are respectively configured for aggregation levels #1, #2, #4 and #8 and thus 15 blind decodings are required in the case of FIG. 16. Accordingly, one blind decoding capability may be left.

When a plurality of ECCEs is aggregated to form an EPDCCH candidate, if the number of set ECCEs is insufficient, then various combinations of EPDCCH candidates may be configured while using restricted resources by changing combinations of aggregated ECCEs. In the case of FIG. 16, when the extra blind decoding capability is used for aggregation level #2, new EPDCCH candidates can be configured by changing combinations of aggregated ECCEs while using the existing ECCEs since all ECCEs have been used for EPDCCH candidates of aggregation level #2.

Figure 17:
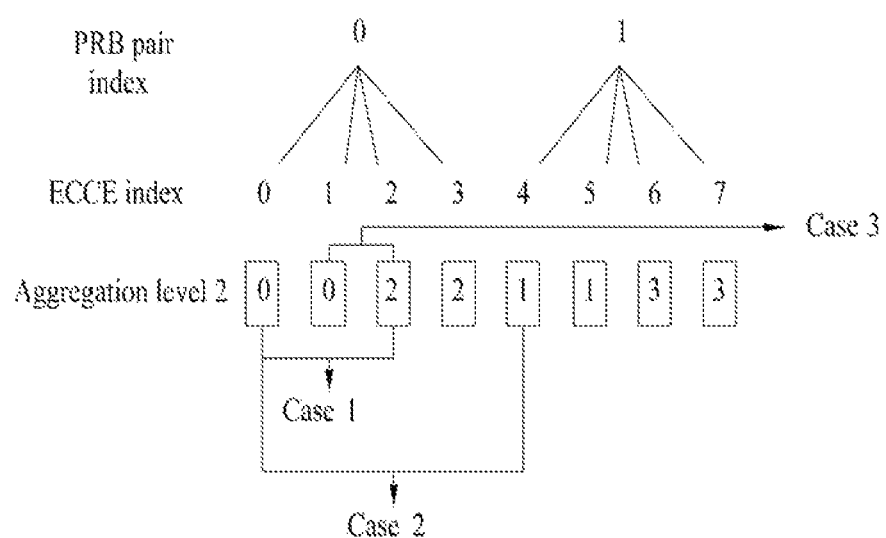
FIG. 17 illustrates EPDCCH candidates configured in 2 PRB pairs for blind decoding of an EPDCCH according to an embodiment of the present invention.

FIG. 17 illustrates another example of EPDCCH candidates configured in 2 PRB pairs for blind decoding of an EPDCCH according to an embodiment of the present invention. Particularly, FIG. 17 illustrates a case in which extra blind decoding capability is used for aggregation level #2.

Referring to FIG. 17, a new EPDCCH candidate localized in a frequency region present in PRB pair #0 is formed using ECCEs #0 and #2 in case 1. In case 2, a new EPDCCH candidate distributed in frequency regions over the two PRB pairs is formed using ECCEs #0 and #4. In case 3, while two contiguous ECCEs are aggregated like other EPDCCH candidates, an offset (a value smaller than the corresponding aggregation level, which is 1 ECCE corresponding to half the aggregation level 2 in this case) is applied to the aggregation start point such that a combination of two contiguous ECCEs, which is different from previous EPDCCH candidates, is generated even when the two contiguous ECCEs are aggregated. Particularly, the offset is preferably less than the aggregation level. In FIG. 17, 1 ECCE corresponding to half the aggregation level is assumed as the offset.

This operation can be applied to other aggregation levels. For example, if extra blind decoding capability is used for aggregation level #4 in FIG. 16, new EPDCCH candidates of aggregation level #4 can be configured using ECCEs #0, #1, #4 and #5 distributed in the two PRB pairs.

In addition, when the number of set ECCEs is insufficient to configure a search space using only ECCEs which are exclusive or are not repeatedly used at a specific aggregation level, the search space may be configured such that EPDCCH candidates partially overlap by reducing a spacing between EPDCCH candidates to less than the specific aggregation level.

Figure 18:
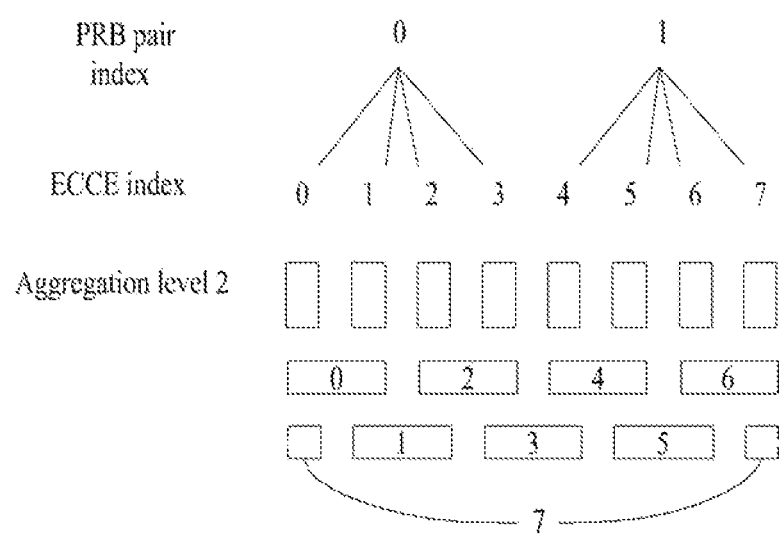
FIG. 18 illustrates EPDCCH candidates configured in 2 PRB pairs for blind decoding of an EPDCCH according to an embodiment of the present invention.

FIG. 18 illustrates another example of EPDCCH candidates configured in 2 PRB pairs for blind decoding of an EPDCCH according to an embodiment of the present invention.

Referring to FIG. 18, when EPDCCH candidates of aggregation level #2 are configured, a spacing between start positions of EODCCH candidates is set to 1 ECCE such that neighboring EPDCCH candidates share some ECCEs. Specifically, EPDCCH candidates #0 and #1 share ECCE #1. While 8 EPDCCH candidates of aggregation level #2 are configured using 8 ECCEs in FIG. 18, only some of the EPDCCH candidates may be included in an actual search space according to blind decoding capability of the UE.

When carrier aggregation is applied, if one component carrier carries control signals for other component carriers, that is, if cross carrier scheduling is performed, then the number of EPDCCH candidates necessary per aggregation level may increase. In this case, the operation of adjusting a spacing between EPDCCH candidates or the operation performed when ECCEs to be used for EPDCCH candidates overlap may be controlled by the number of component carriers, which is adjusted in the corresponding EPDCCH search space.

More specifically, when 6 PRB pairs are set and control signals for 2 component carriers are transmitted, as shown in FIG. 10, 12, 12, 4 and 4 EPDCCH candidates are necessary for aggregation levels #1, #2, #4 and #8, respectively. In this case, a predetermined spacing may be set between EPDCCH candidates of aggregation levels #1 and #2 so as to uniformly distribute EPDCCH candidates in the given PRB pairs.

Figure 19:
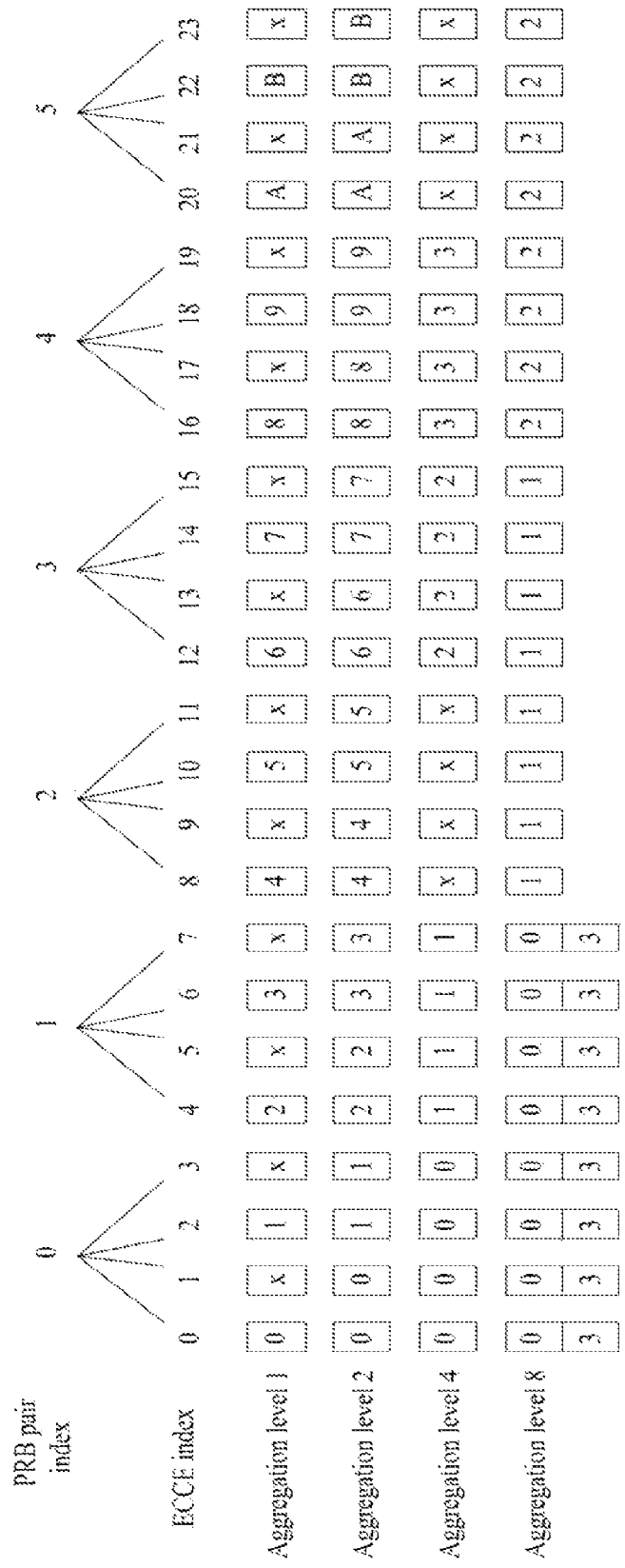
FIG. 19 illustrates EPDCCH candidates configured in 6 PRB pairs for blind decoding of an EPDCCH in an environment to which carrier aggregation is applied according to an embodiment of the present invention.

FIG. 19 illustrates EPDCCH candidates configured in 6 PRB pairs for blind decoding of an EPDCCH in an environment where carrier aggregation is applied according to an embodiment of the present invention. In FIGS. 19, A and B respectively denote EPDCCH candidates #10 and #11.

Referring to FIG. 19, a spacing corresponding to 2 ECCEs is set between EDPCCH candidates of aggregation levels #1 and #2. While EPDCCH candidate #3 of aggregation level #8 is configured such that EPDCCH candidate #3 and EPDCCH candidate #0 overlap since there is no extra resource in FIG. 19, EPDCCH candidates may be configured in a different combinations of ECCEs or the corresponding EPDCCH candidate may be deleted and the number of EPDCCH candidates of another aggregation level may be increased by applying the principle of the present invention.

As a generalization of the aforementioned operation of adjusting a spacing between EPDCCH candidates, when control signals for N component carriers are transmitted, the spacing Y between EPDCCH candidates may be set to X/N if the spacing in the case of one component carrier is set to X. To integerize this, a function such as floor(X), ceil(X) or the like may be applied. In addition, X may be limited such that X is greater than or equal to 1 all the time since the spacing between EPDCCH candidates needs to be maintained as at least 1 ECCE.

In the case of operation shown in FIG. 19, when EPDCCH candidates having consecutive indices are allocated to one component carrier, EPDCCH candidates allocated to a specific component carrier may be concentrated on a specific PRB pair. In this case, control signal transmission opportunity with respect to the corresponding component carrier may be reduced when channel state of the corresponding PRB pair is deteriorated. To solve this problem, EPDCCH candidates can be alternately allocated to component carriers.

Referring to FIG. 19, when EPDCCH candidate #0 is allocated to component carrier #0, EDPCCH candidate #1 is allocated to component carrier #1 and EPDCCH candidate #2 is allocated to component carrier #2. When two component carriers are set, EPDCCH candidates with even-numbered indices are allocated to component carrier #0 and EPDCCH candidates with odd-numbered indices are allocated to component carrier #1. According to generalization of this scheme, when control signals for N component carriers are transmitted, EPDCCH candidate #n is allocated to component carrier #(n mod N).

In addition, the spacing between EPDCCH candidates may be maintained as that when only one component carrier is present and a predetermined offset is applied between EPDCCH candidates corresponding to each component carrier.

Figure 20:
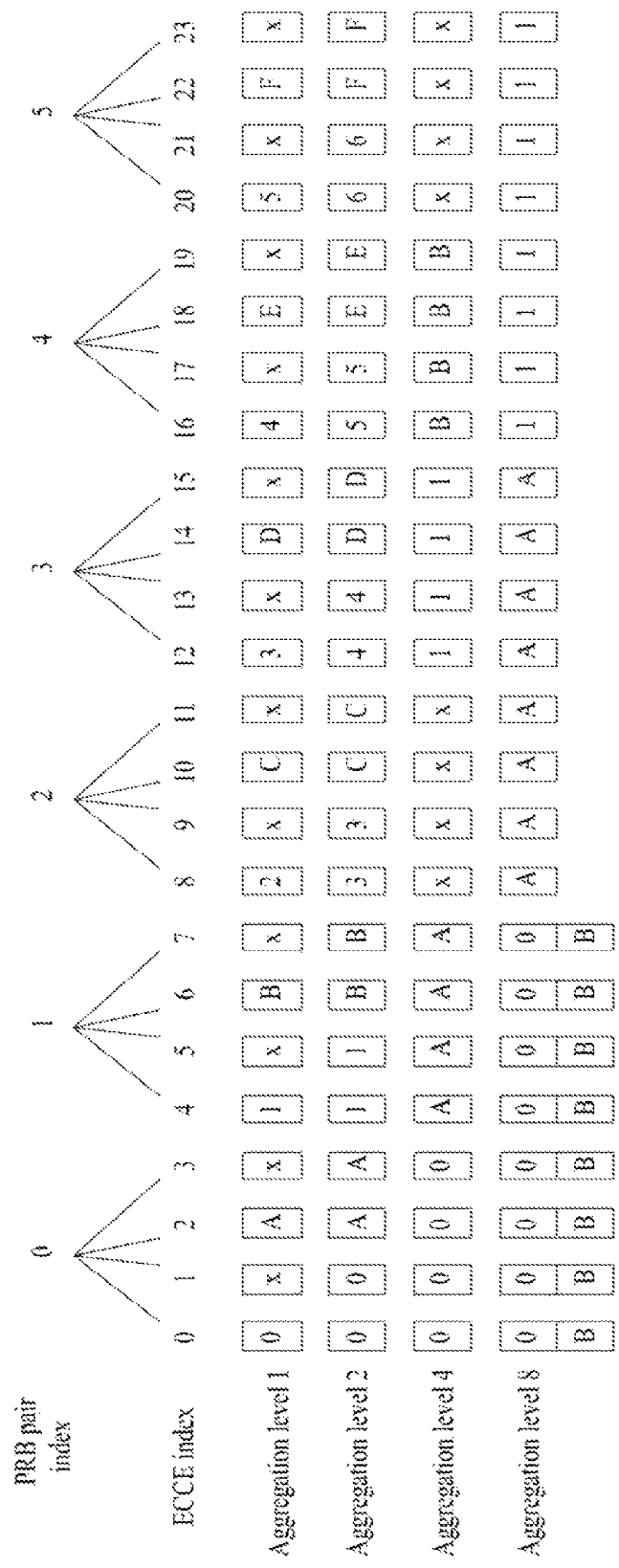
FIG. 20 illustrates EPDCCH candidates configured in 6 PRB pairs for blind decoding of an EPDCCH in an environment to which carrier aggregation is applied according to an embodiment of the present invention.

FIG. 20 illustrates another example of EPDCCH candidates configured in 6 PRB pairs for blind decoding of an ePDCCH in the environment where carrier aggregation is applied according to an embodiment of the present invention.

Referring to FIG. 20, when it is assumed that EPDCCH candidates #0, #1, . . . , #5 are allocated to component carrier #0 and EPDCCH candidates #A, #B, . . . , #F are allocated to component carrier #1, a search space is formed by providing an offset corresponding to 2 ECCEs between the component carriers while maintaining a spacing of 4 ECCEs between EPDCCH candidates corresponding to each component carrier.

Figure 21:
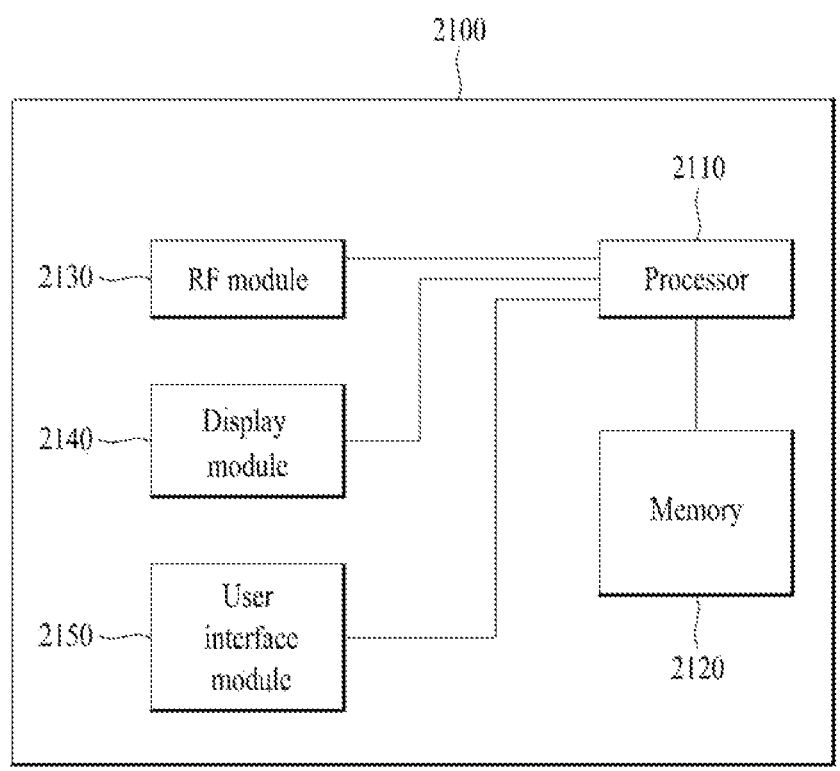
FIG. 21 is a block diagram of a communication apparatus according to an embodiment of the present invention.

FIG. 21 is a block diagram of a communication apparatus according to an embodiment of the present invention.

Referring to FIG. 21, a communication apparatus 2100 includes a processor 2110, a memory 2120, an RF module 2130, a display module 2140 and a user interface module 2150.

The communication apparatus 2100 is illustrated for convenience of description and some modules may be omitted. Furthermore, the communication apparatus 2100 may further include necessary modules. Some modules of the communication apparatus 2100 may be subdivided. The processor 2110 is configured to perform operations according to the embodiments of the present invention, described with reference to attached drawings. Refer to descriptions of FIGS. 1 to 20 for detailed operations of the processor 2110.

The memory 2120 is connected to the processor 2110 and stores an operating system, applications, program code, data, etc. The RF module 2130 is connected to the processor 2110 and converts baseband signals into RF signals or converts RF signals into baseband signals. To achieve this, the RF module 2130 performs analog conversion, amplification, filtering and frequency upconversion or reverse operations thereof. The display module 2140 is connected to the processor 2110 and displays various types of information. The display module 2140 may use a well-known element such as an LCD (Liquid Crystal Display), LED (Light Emitting Diode), OLED (Organic Light Emitting Diode) or the like. However, the display module 2140 is not limited thereto. The user interface module 2150 may be connected to the processor 2110 and configured in the form of a combination of well-known user interfaces such as a keypad, touchscreen and the like.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method for transmitting/receiving a downlink control channel in a wireless communication system and the apparatus therefor have been described in the context of a 3GPP LTE system, the present invention is also applicable to many other wireless communication systems.

The invention claimed is:
1. A method for receiving an EPDCCH (Enhanced Physical Downlink Control Channel) from a base station by a user equipment (UE) in a wireless communication system, the method comprising:

monitoring at least one EPDCCH candidate comprising one or more enhanced control channel elements (ECCEs) in resource blocks for the EPDCCH, and
receiving the EPDCCH,
wherein a number of ECCEs forming each of the at least one EPDCCH candidate corresponds to an aggregation level,
wherein the number of ECCEs per resource block is 4,
wherein, when a number of the resource blocks for the EPDCCH is 2, the number of the at least one EPDCCH candidate corresponding to the aggregation level is defined as a value obtained by dividing a total number of ECCEs by the aggregation level,
wherein, when the number of the resource blocks for the EPDCCH is not 2, the number of the at least one EPDCCH candidate corresponding to the aggregation level is set to a fixed value.

2. The method according to claim 1, wherein the aggregation level is one of 1, 2, 4 or 8.

3. A UE in a wireless communication system, comprising:
a radio frequency module;
a processor configured to obtain an EPDCCH by monitoring at least one EPDCCH candidate composed of one or more enhanced control channel elements (ECCEs) in resource blocks for the EPDCCH,
wherein a number of ECCEs forming each of the at least one EPDCCH candidate corresponds to an aggregation level and to receive the EPDCCH via the radio frequency module by monitoring the at least one EPDCCH candidate,
wherein the number of ECCEs per resource block is 4,
wherein the processor sets the number of the at least one EPDCCH candidate corresponding to the aggregation level as a value obtained by dividing a total number of ECCEs by the specific aggregation level when a number of the resource blocks is 2,
wherein the processor sets the number of the EPDCCH candidates corresponding to the aggregation level to a fixed value when the number of the resource blocks is not 2.

4. The UE according to claim 3, wherein the aggregation level is one of 1, 2, 4 or 8.

* * * * *